(12) United States Patent
Yokoyama et al.

(10) Patent No.: US 11,345,121 B2
(45) Date of Patent: May 31, 2022

(54) COLORING OF METALLIC MATERIALS COATED WITH ALUMINUM

(71) Applicant: Apple Inc., Cupertino, CA (US)

(72) Inventors: Yoshihiko Yokoyama, Tokyo (JP); Naoto Matsuyuki, Tokyo (JP); James A. Wright, Palos Verdes Estates, CA (US); Brian M. Gable, San Jose, CA (US); William A. Counts, Sunnyvale, CA (US); Eric W. Hamann, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 16/144,847

(22) Filed: Sep. 27, 2018

(65) Prior Publication Data

US 2019/0099982 A1    Apr. 4, 2019

Related U.S. Application Data

(60) Provisional application No. 62/565,226, filed on Sep. 29, 2017.

(51) Int. Cl.
| | |
|---|---|
| B32B 15/01 | (2006.01) |
| B32B 7/12 | (2006.01) |
| B23K 11/20 | (2006.01) |
| B23K 11/11 | (2006.01) |
| B23K 20/12 | (2006.01) |

(Continued)

(52) U.S. Cl.
CPC ........ *B32B 15/012* (2013.01); *B23K 11/0026* (2013.01); *B23K 11/11* (2013.01); *B23K 11/20* (2013.01); *B23K 11/34* (2013.01); *B23K 20/12* (2013.01); *B23K 20/129* (2013.01); *B23K 20/1265* (2013.01); *B23K 20/2275* (2013.01); *B23K 20/2336* (2013.01); *B32B 7/12* (2013.01); *B32B 15/016* (2013.01); *B23K 2101/38* (2018.08); *B23K 2103/05* (2018.08); *B23K 2103/10* (2018.08); *B23K 2103/18* (2018.08); *B23K 2103/20* (2018.08); *B32B 37/06* (2013.01); *B32B 37/10* (2013.01); *B32B 2309/02* (2013.01); *B32B 2309/12* (2013.01); *B32B 2310/027* (2013.01);

(Continued)

(58) Field of Classification Search
None
See application file for complete search history.

(56) References Cited

U.S. PATENT DOCUMENTS

| | | | | |
|---|---|---|---|---|
| 3,917,151 | A | * | 11/1975 | Robinson ............... C22C 21/02 228/220 |
| 8,158,273 | B2 | * | 4/2012 | Wittebrood ........ B23K 35/0238 428/654 |
| 2016/0362764 | A1 | * | 12/2016 | Sohn ..................... C22F 1/043 |

FOREIGN PATENT DOCUMENTS

WO    WO2016104879    *    6/2016

OTHER PUBLICATIONS

Kure et al., "Formation of self-organized nanoporous anodic films on Type 304 stainless steel," *Electrochemistry Communications*, vol. 21, (2012), pp. 1-4.

(Continued)

*Primary Examiner* — Daniel J. Schleis
(74) *Attorney, Agent, or Firm* — BakerHostetler

(57) ABSTRACT

The disclosure provides an aluminized composite including a base material. The aluminized composite may also include a diffusion layer disposed over the base material. The aluminized composite may further include an aluminum material disposed over the diffusion layer.

11 Claims, 9 Drawing Sheets

(51) Int. Cl.

| | |
|---|---|
| *B23K 20/227* | (2006.01) |
| *B23K 11/34* | (2006.01) |
| *B23K 20/233* | (2006.01) |
| *B23K 11/00* | (2006.01) |
| *B32B 37/06* | (2006.01) |
| *B32B 37/10* | (2006.01) |
| *B23K 103/10* | (2006.01) |
| *B23K 103/20* | (2006.01) |
| *B23K 103/04* | (2006.01) |
| *B23K 101/38* | (2006.01) |
| *B23K 103/18* | (2006.01) |

(52) U.S. Cl.
CPC ....... *B32B 2311/24* (2013.01); *B32B 2311/30* (2013.01); *Y10T 428/12764* (2015.01)

(56) References Cited

OTHER PUBLICATIONS

Morita et al., "Applications of Electroplating with Aluminium from the Molten Salt at Room Temperature," *Journal of the Finishing Society of Japan*, 1989, vol. 40, Issue 1, pp. 56-57, with machine translation obtained via Google Translate.

Nippon Light Metal Company, Ltd., "Capacitor Foil Business," http://www.nikkeikin.com/products/electrode/index.html, published Feb. 12, 2013, accessed Sep. 19, 2018, 2 pages.

Shinko Kinzoku Co., Ltd., "Aluminizing treatment," http://www.shinko-kinzoku.co.jp/public.html/page02-01.html, published Jan. 28, 2014, accessed. Sep. 19, 2018, translation provided by Google, 4 pages.

Cemedine, "Products—Automobiles Adhesive," http://www.cemedine.co.jp/e/product/automobiles_adhesive.html, published Oct. 2, 2017, accessed Sep. 19, 2018, 6 pages.

\* cited by examiner

COLORING OF METALLIC MATERIALS COATED WITH ALUMINUM

CROSS-REFERENCE TO RELATED PATENT APPLICATIONS

This patent application claims the benefit under 35 U.S.C. § 119(e) of U.S. Patent Application Ser. No. 62/565,226, entitled "COLORING OF ALUMINIZED MATERIALS," filed on Sep. 29, 2017, which is incorporated herein by reference in its entirety.

FIELD

The disclosure is directed to coloring metallic materials by anodization. In particular, the disclosure is directed to methods for forming an aluminum coating over metallic materials.

BACKGROUND

It is difficult to obtain the durability, hue, and various colors by anodizing stainless steel, titanium alloys, or recycled aluminum compared with anodization of aluminum or aluminum alloys (Alumite).

One method for aluminization of a metallic part is to dip the metallic part in an aluminum melt. This dipping technique has been used to increase corrosion resistance of metallic coatings, such as zinc and tin coatings. However, the dipping temperature may be too high to control the viscosity of aluminum melt. The composition of aluminum melt can be controlled to obtain uniformity of the aluminum coating with a desirable structure. The thickness of the aluminum coating can be controlled by the temperature of the substrate and the aluminum melt. The thickness of the aluminum coating may also be affected by pulling velocity, such as spinning after dipping. Also, surface treatment of the substrate, including oxidation, electro-plating, blasting, among others, may affect the wettability between the substrate and aluminum melt and thus affect the thickness of the aluminum coating. By adjusting these processing parameters, the thickness of a/the dipped aluminum coating film can be controlled. A rather wide diffusion layer formed in the dipping usually contains harmful elements against anodized dye-coloring. It is difficult to control the diffusion layer, since the diffusion in the liquid occurs extremely fast.

Alternatively, spray forming, such as cold spray, warm spray, and hot spray, can be used for aluminization. However, the tact time and productivity of spray forming may be lower than the dipping technique. Also, spray forming is more sensitive to surface conditions, such as voids, cracks, and/or cold shuts. Further, it is difficult to control the thickness of the aluminum coating. Another common method for aluminization is cold spraying. However, there still remain issues with surface defects, including voids and cracks, generated during spraying. The surface defects are not good for coloring.

The microstructure defects of both the dip-plating and the spray-formed aluminized coating reveal problems with cosmetic issues, which become more significant when the aluminized coating is colored by using dye.

There remains a need to develop techniques for coloring stainless steel or recycled aluminum.

BRIEF SUMMARY

The disclosure is directed to coloring metallic materials by anodization.

In one aspect, an aluminized composite may include a base material (i.e., a substrate). The aluminized composite may also include a diffusion layer disposed on the base material. The aluminized composite may further include an aluminum material disposed on the diffusion layer. In various aspects, the aluminum material may not contain impurities that may affect anodized dye coloring.

In another aspect, a method is provided for coloring a base material. The method may include placing a stack of layers comprising a base material, a diffusion layer, and an aluminum layer in a joining device. A pressure is applied to the stack of layers. The stack of layers is heated to a first elevated temperature for a first period of time to join the aluminum layer to the base material.

In another aspect, an aluminized composite includes a base material and an aluminum layer disposed on the base material to form a contact region between the base material and aluminum layer. A first portion of the base material is adhesively bonded to a first portion of the aluminum layer in the contact region. A second portion of the base material is locally welded to a second portion of the aluminum layer in the contact region. The portion of the aluminum layer opposite the second portion of the contact region has an average grain size the same as the portion of the aluminum layer opposite the first portion of the contact region.

In some aspects, the disclosure is directed to a method of joining an aluminum foil to a base material. An adhesive is applied between a base material and an aluminum foil to fix the relative position of the base material to the aluminum foil. The base material and aluminum foil are welded together. The portion of the aluminum layer opposite the second portion of the contact region has an average grain size the same as the portion of the aluminum layer opposite the first portion of the contact region.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The disclosure may be understood by reference to the following detailed description, taken in conjunction with the drawings as described below. It is noted that, for purposes of illustrative clarity, certain elements in various drawings may not be drawn to scale.

The disclosure provides methods for applying an aluminum coating on a metallic material to form an aluminized material. The aluminized material can be color dyed to have various desirable colors.

In some embodiments, the disclosure provides an Aluminum-Silicon (Al—Si) diffusion layer between the aluminum coating and the base material to form a 2D aluminized composite. The disclosure also provides an apparatus and methods for joining the aluminum coating to the base material. The disclosure further provides results from ultrasonic inspection of the bonding between the aluminum coating and the base material and also from tensile tests and bending tests. The 2D composite can be colored after anodizing.

In some embodiments, the disclosure provides a method of combining adhesive bonding and local heating to join an aluminum layer, such as an aluminum clad foil, to a base material. The local heating may include resistance spot welding or friction stir welding. The base material may be in a three-dimensional (3D) or a 2.5 dimensional (2.5D) shape. The 2.5D is the 3D with an open side.

I. Two Dimensional (2D) Aluminized Composite

Figure 1:
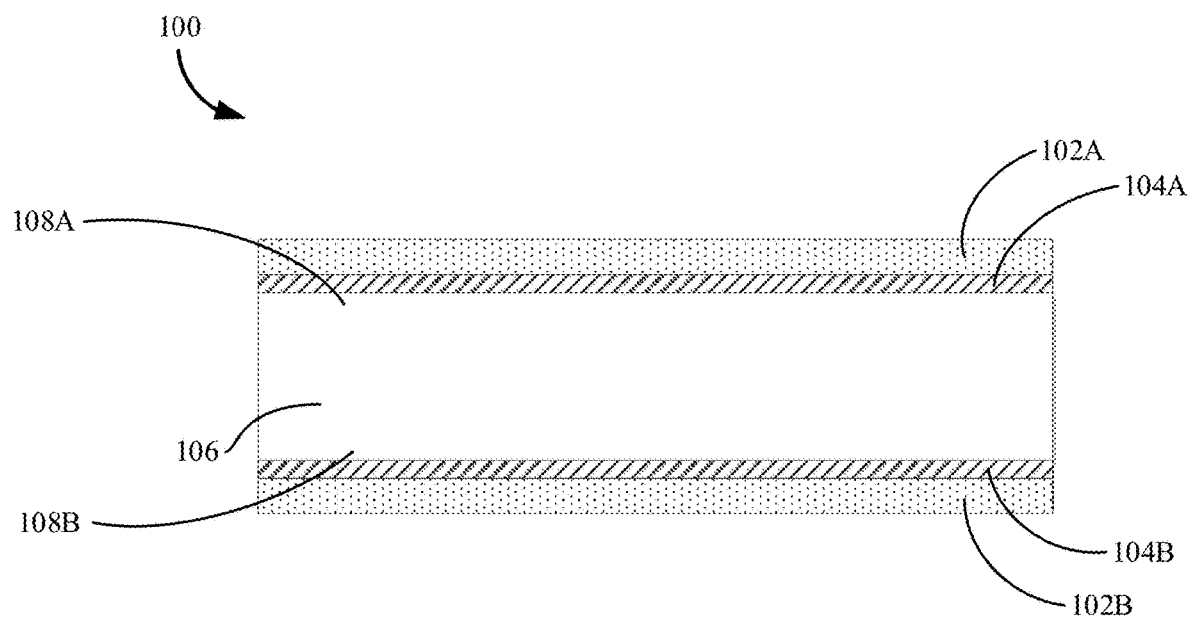
FIG. 1 illustrates an aluminized composite including an aluminum coated base material in accordance with embodiments of the disclosure.

FIG. 1 illustrates an aluminized composite including an aluminum coated base material in accordance with embodiments of the disclosure. As shown in FIG. 1, a 2D composite or aluminized composite 100 includes an aluminum layer 102A deposited over a two-dimensional base material 106 having a first side 108A and a second opposite side 108B.

In some variations, the aluminum layer or coating 102A can provide cosmetic appeal for the base material 106 such that the base material 106 can use any material including steel and recycled aluminum that may be difficult to color. The aluminum coatings 102A and 102B can be aluminized and colored.

The aluminum layer 102A or 102B may include pure aluminum or aluminum alloys. The aluminum layer 102A or 102B can be easily anodized and colored. For example, the alloys may include, but are not limited to, Al 1000, Al 6063, Al6065, Al 7003, and Al 7075, among others.

In some embodiments, the pure aluminum contains at least 99.8 wt % Al. In some embodiments, the pure aluminum contains at least 99.95 wt % Al. In some embodiments, the pure aluminum contains at least 99.999 wt % Al. In some embodiments, the pure aluminum contains at least 99.9999 wt % Al.

In some embodiments, the aluminum layer can include elemental impurities. The elemental impurities can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. In some embodiments, the impurities can be less than or equal to 1 wt %. In some embodiments, the impurities can be less than or equal to 0.5 wt %. In some embodiments, the impurities can be less than or equal to or 0.1 wt %. In some embodiments, these percentages can be volume percentages instead of weight percentages.

The aluminum layer may be sufficiently thick to be uniformly colored. The thickness of the aluminum layer may vary with the base material. In some embodiments, the aluminum layer may be at least 1 μm thick. In some embodiments, the aluminum layer may be at least 10 μm thick. In some embodiments, the aluminum layer may be at least 50 μm thick. In some embodiments, the aluminum layer may be at least 100 μm thick. In some embodiments, the aluminum layer may be at least 150 μm thick. In some embodiments, the aluminum layer may be at least 200 μm thick. In some embodiments, the aluminum layer may be at least 250 μm thick. In some embodiments, the aluminum layer may be at least 300 μm thick.

I. (a) 2D Base Material

The base material can include a material that is anodized before dye coloring. In some embodiments, the base material 106 may include a high tensile strength stainless steel. The stainless steel has a higher Young's modulus than aluminum, such that the stainless base material may be useful for applications where high stiffness is desirable for the material.

In some embodiments, the base material 106 may include a low cost and strong steel which does not need to have cosmetic appeal. The low cost steel is also difficult to be colored. The aluminized composite including the steel can be colored more easily and provides the desired cosmetic appeal. In some embodiments, the low cost and strong steel may have a tensile strength of at least 200 MPa. In some embodiments, the low cost and strong steel may have a tensile strength of at least 300 MPa. In some embodiments, the low cost and strong steel may have a tensile strength of at least 400 MPa. In some embodiments, the low cost and strong steel may have a tensile strength of at least 500 MPa.

In some embodiments, the base material 106 may include recycled aluminum. The recycled aluminum may include impurities, for example Fe and Si, among others. The recycled aluminum cannot be directly anodized due to the presence of impurities. The aluminized recycled aluminum can be easily colored. In some embodiments, the impurities may be at least 20 wt %. In some embodiments, the impurities may be at least 15 wt %. In some embodiments, the impurities may be at least 10 wt %. In some embodiments, the impurities may be at least 5 wt %. In some embodiments, the impurities may be at least 1 wt %.

I. (b) Diffusion Layer

When an Al—Si alloy is used as a brazing alloy for joining, the aluminized composite 100 may include a first Si-enriched diffusion layer 104A between the aluminum layer 102A and a first side 108A of the base material 106. The diffusion layer 104A may include Al and Si.

The diffusion layer has a relatively low melting point such that the diffusion layer may melt while the base material and the aluminum layer remain solid during joining. The diffusion layer helps promote better bonding between the aluminum layer 102A and the base material 106 than without the diffusion layer.

Referring again to FIG. 1, the second side 108B of the base material 106 may be coated by a second aluminum layer 102B. Between the aluminum layer 102B and the second side 108B of the base material 106, there may be a second diffusion layer 104B.

In the case of Al and Si, Si precipitates almost pure Si, since the Al—Si system is eutectic. The equilibrium saturated maximum Si % against Al as solid solution is about 1.59% at an eutectic temperature of about 577° C. In various embodiments, the Si content in Al matrix may be lower than 0.5 to 1.0 atomic % to avoid the precipitation of Si in Al matrix. Si can be harmful to the anodizing process. Therefore, the thickness of the diffusion layer may be reduced to benefit the anodized dye-coloring. Reduced temperature and reduced time for joining may help reduce the thickness of the diffusion layer. However, the insufficient joining may occur.

In some embodiments, the Al is joined to the base material by coherent joining. A diffusion layer may be thin to obtain a coherent joining interface without any gaps. In some embodiments, the diffusion layer is no greater than 90 μm thick. In some embodiments, the diffusion layer is no greater than 80 μm thick. In some embodiments, the diffusion layer is no greater than 70 μm thick. In some embodiments, the diffusion layer is no greater than 60 μm thick. In some embodiments, the diffusion layer is no greater than 50 μm thick. In some embodiments, the diffusion layer is no greater than 40 μm thick. In some embodiments, the diffusion layer is no greater than 30 μm thick. In some embodiments, the diffusion layer is no greater than 20 μm thick. In some embodiments, the diffusion layer is no greater than 10 μm thick. In some embodiments, the diffusion layer is no greater than 5 μm thick. In some embodiments, the diffusion layer is no greater than 4 μm thick. In some embodiments, the diffusion layer is no greater than 3 μm thick. In some embodiments, the diffusion layer is no greater than 2 μm thick. In some embodiments, the diffusion layer is no greater than 1 μm thick. In some embodiments, the diffusion layer is no greater than 0.5 μm thick. In some embodiments, the diffusion layer is no greater than 0.1 μm thick. In some embodiments, the diffusion layer is no greater than 0.01 μm thick.

In some embodiments, the Al—Si diffusion layer may act as a buffer layer. The thickness of the diffusion layer may vary with the base material or the aluminum alloy. In some embodiments, the diffusion layer may be at least 10 μm thick. In some embodiments, the diffusion layer may be at least 15 μm thick. In some embodiments, the diffusion layer may be at least 20 μm thick. In some embodiments, the diffusion layer may be at least 25 μm thick. In some embodiments, the diffusion layer may be at least 30 μm thick. In some embodiments, the diffusion layer may be at least 35 μm thick. In some embodiments, the diffusion layer may be at least 40 μm thick. In some embodiments, the diffusion layer may be at least 45 μm thick. In some embodiments, the diffusion layer may be at least 50 μm thick. In some embodiments, the diffusion layer may be at least 55 μm thick. In some embodiments, the diffusion layer may be at least 60 μm thick. In some embodiments, the diffusion layer may be at least 65 μm thick. In some embodiments, the diffusion layer may be at least 70 μm thick. In some embodiments, the diffusion layer may be at least 75 μm thick. In some embodiments, the diffusion layer may be at least 80 μm thick. In some embodiments, the diffusion layer may be at least 85 μm thick. In some embodiments, the diffusion layer may be at least 90 μm thick. In some embodiments, the diffusion layer may be at least 95 μm thick. In some embodiments, the diffusion layer may be at least 100 μm thick.

The thickness of the Al—Si diffusion layer is controllable. This is advantageous over the conventional dipping method, which forms a reaction layer, the thickness of which is more difficult to control than the Al—Si diffusion layer.

It will be appreciated by those skilled in the art that additional layers may be included in the composite.

I. (c) Joining Apparatus

Brazing alloy joining can be performed by combination of temperature rise and applying pressure. The temperature rise activates diffusion and the pressure increases contact part at joining interface. In order to create the well joining area, the joining pressure may be applied uniformly even in 2.5D or 3D shaped part. To create a complex 2.5D and 3D wrapping Al-foil, a superplastic Al foil for cladding can be applied on 2.5D and 3D shaped base material. The use of superplastic Al-foil may help wrap the edge and corner of the 2.5D and 3D part, because the superplastic Al can deform like honey.

Figure 2:
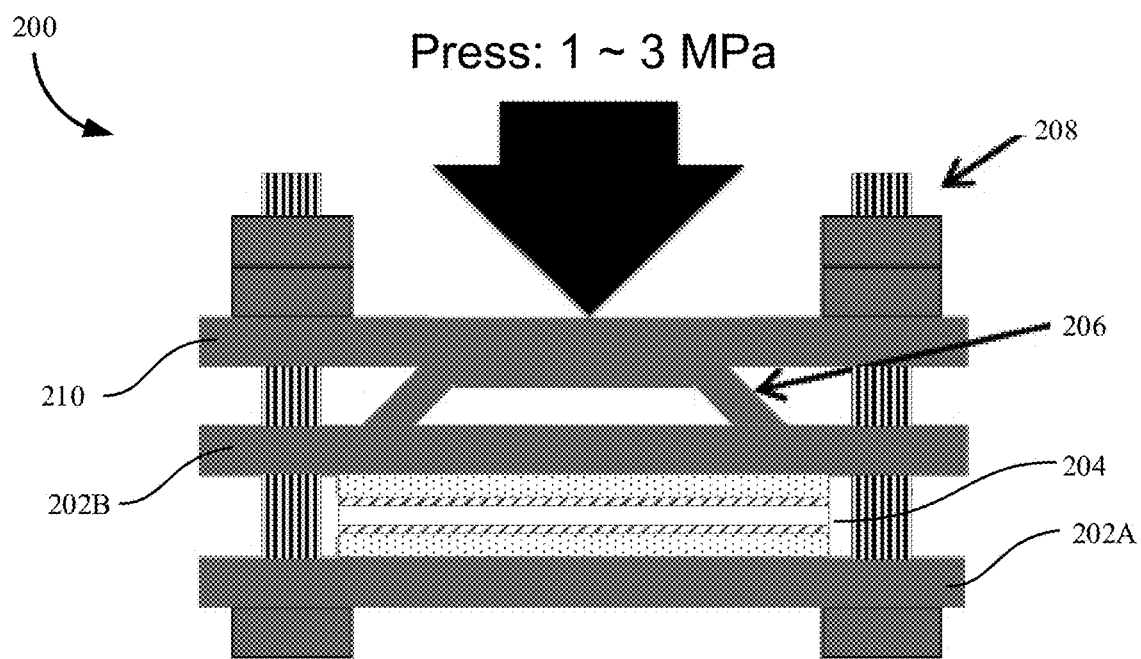
FIG. 2 illustrates an example joining apparatus for forming an aluminized composite in accordance with embodiments of the disclosure.

FIG. 2 illustrates an example joining apparatus for forming the aluminized composite of FIG. 1 in accordance with embodiments of the disclosure. A joining apparatus 200 may include a base plate 202A that supports a sample 204. The joining apparatus 200 may also include a middle plate 202B that applies a compressive force or pressure to the sample 204. In some embodiments, the sample 204 can be the composite or aluminized composite 100. The joining apparatus 200 may also include leaf springs between a top plate 206 and the middle plate 202B. The base plate 202A and the middle plate 202B are fastened together with the top plate 206 by using screws 208.

The apparatus is configured to vary pressure, preheating temperature, and joining temperature, as well as joining time. The joining of aluminum layer and the base material can be performed at an elevated temperature to melt the diffusion layer including A and Si while both the base material and the aluminum layer remain in solid state.

I. (d) Joining Method and Ultrasonic Inspection of Bonding Area

A joining method for forming an aluminized composite may include placing a stack of layers comprising at least one diffusion layer between a base material and an aluminum layer in the joining apparatus. The joining method may further include applying a first and a second diffusion layer over a first side and a second opposite side of the base material and applying a first and a second aluminum layer over the first and second diffusion layers to form the stack of layers. Each of the first and second diffusion layers comprises Al—Si. Each of the first and second diffusion layers has a melting temperature lower than the first and second aluminum layers.

The joining method may also include applying a pressure to the stack of layers. The pressure may affect the bonding between the base material and the aluminum layer.

The joining method may also include preheating the stack of layers to an elevated temperature for a period of time to form a preheated stack. The aluminum layer 102A or 102B may be oxidized on its surface prior to joining. Preheating the aluminized composite 100 may help break the aluminum oxide formed on the surface of the aluminum layer 102A and/or 102B. This preheating step may help improve the bonding between the aluminum layer and the base material.

The joining method may also include heating the preheated stack to an elevated temperature for a period of time to join the aluminum layer to the base material. The elevated temperature and the period of time may also affect the bonding between the base material and the aluminum layer.

The joining conditions for achieving the desirable bonding between the base material and the aluminum layer may vary with the base material. In some embodiments, when the base material is a recycled aluminum having a lower melting temperature than the stainless steel, the joining temperature may be lower than that for the stainless steel base material to reduce the effect of heating effect on the microstructure. In some embodiments, the heating time during joining of the aluminum layer and the recycled aluminum may be shorter than the stainless steel to reduce the effect of heating on the microstructure of the recycled aluminum.

Without being limited to a particular mechanism of action, varying the joining conditions, such as pressure, joining temperature, and joining time, or by preheating the composite or aluminized composite, may affect the bonding area between the base material and the aluminum layer.

In some embodiments, the elevated temperature for joining is around the melting temperature of the diffusion layer, for example, 600° C. In some embodiments, the elevated temperature for preheating may be lower than the elevated temperature for joining. In some embodiments, the elevated temperature for preheating may be high than the elevated temperature for joining. In some embodiments, the elevated temperature for preheating may be about the same as the elevated temperature for joining.

The bonding between the aluminum layer and the base material may be inspected non-destructively, for example, by using an ultrasonic imaging technique for inspection. Ultrasonic images may be acquired for the joining area between the base material and the aluminum layer. The insufficient bonding area (IBA) may be quantitatively determined based upon the ultrasonic images.

In some embodiments, the insufficient bonding area may be at least 80%. In some embodiments, the insufficient bonding area may be at least 85%. In some embodiments, the insufficient bonding area may be at least 90%. In some embodiments, the insufficient bonding area may be at least 95%.

I. (e) Examples

In the following examples, the base material is formed of SUS 304 and is 1 mm thick. The SUS 304 has a Young's modulus of about 193 GPa and a tensile strength of about 520 MPa. The aluminum coatings 102A and 102B may be 0.5 mm thick. The Al—Si diffusion layer is 20 μm thick. The aluminum layer may be at least 0.5 μm thick.

Table 1 lists joining conditions including preheating temperature and time and joining temperature and time. Table 1 also lists the insufficient bonding area (IBA) under each joining condition. As shown in Table 1, without preheating, Configuration 1 including aluminum and stainless steel base material yields an IBA of 7% under a pressure of 3 MPa at a joining temperature of 600° C. for a joining time of 5 minutes. Configuration 2 including 5N—Al/SPFC980 is preheated at an elevated temperature of 545° C. for a time of 20 minutes and then joined under a pressure of 3 MPa at an elevated temperature of 600° C. for a time of 5 minutes, which yields an IBA of 8%. Configuration 3 including 5N—Al/SPcc is preheated at an elevated temperature of 545° C. for a time of 15 minutes and then joined under a pressure of 3 MPa at an elevated temperature of 600° C. for a time of 5 minutes, which yields an IBA of 3%.

In Table 1, referring to the Configuration 1, the 5N—Al is 99.999% pure aluminum and is 1 mm thick. The SUS is 3 mm thick. The diffusion layer between the 5N—Al and SUS is 15 μm thick.

Referring to the Configuration 2, the SPFC980 is steel. The diffusion layer between the 5N—Al and the SPFC980 is 30 μm thick.

Referring to the Configuration 3, the SPcc is steel with Carbon (C) of up to 0.15 percent, Manganese (Mn) of up to 0.60 percent, Phosphorous (P) of up to 0.050 percent, Sulphur (S) of up to 0.050 percent. The diffusion layer between the Al-1050 and the SPcc is 30 μm thick.

TABLE 1

Joining Conditions and Preheating Conditions

| Configuration | Pre-heat Temp. (° C.) | Pre-heat Time (min.) | Joining Temp. (° C.) | Joining Time (min.) | Pressure (MPa) | IBA |
|---|---|---|---|---|---|---|
| 5N-Al/SUS | n/a | n/a | 600 | 5 | 3 | 7% |
| 5N-Al/SPFC980 | 545 | 20 | 600 | 5 | 3 | 8% |
| Al-1050/SPcc | 545 | 15 | 600 | 5 | 3 | 3% |

Figure 3:
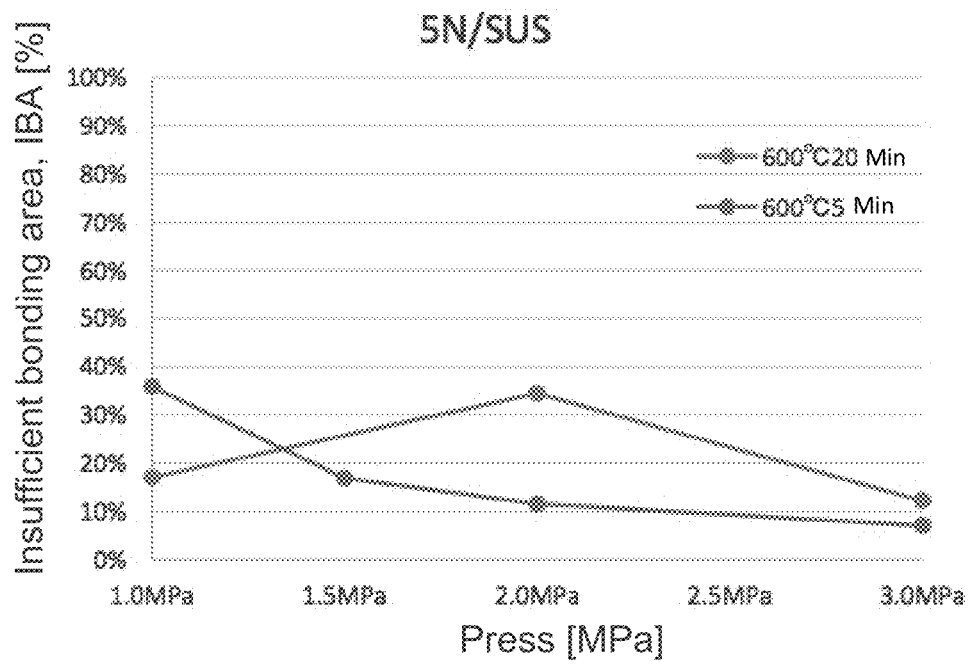
FIG. 3 shows how pressure, temperature, and time affect the bonding area for Configuration 1 in accordance with embodiments of the disclosure.

FIG. 3 shows how pressure, temperature, and time affect the bonding area for Configuration 1 (5N—Al/SUS) in accordance with embodiments of the disclosure. As shown in FIG. 3, when pressure increases to 3 MPa, the insufficient bonding area reduces to the lowest value of 7% regardless of the joining temperature or time. For example, at the constant joining temperature of 600° C. for 5 minutes, the IBA reduces from about 35% at a pressure of 1 MPa to about 10% at a pressure of 2 MPa, and further reduces to 7% at a pressure of 3 MPa.

When the joining time changes from 5 minutes to 20 minutes, at the constant joining temperature of 600° C., the IBA increases from about 18% at a pressure of 1 MPa to about 35% at a pressure of 2 MPa, and further reduces to about 11% at a pressure of 3 MPa.

Figure 4:
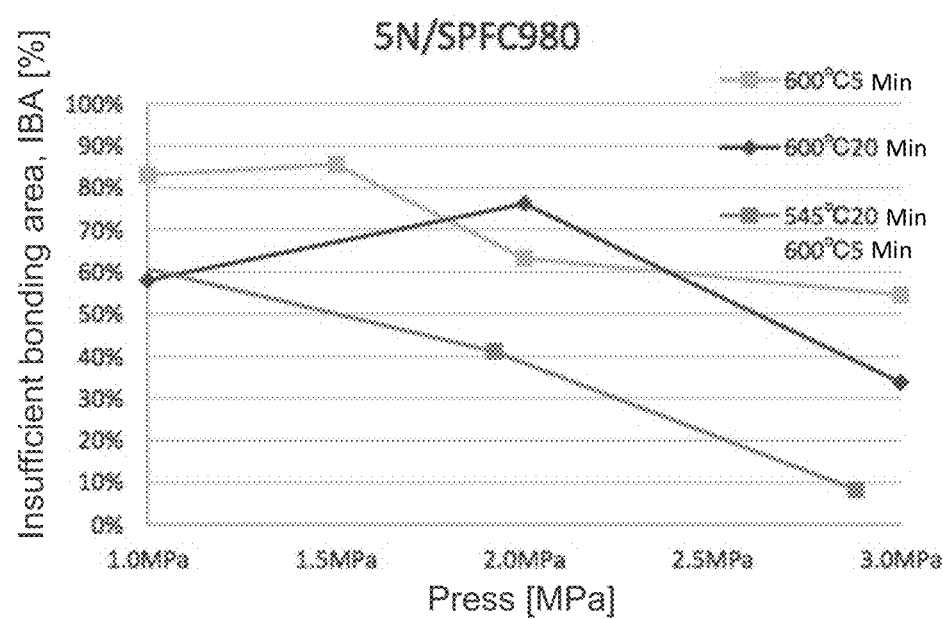
FIG. 4 shows how pressure, temperature, and time affect the bonding area for Configuration 2 in accordance with embodiments of the disclosure.

FIG. 4 shows how pressure, temperature, and time affect the bonding area for Configuration 2 (5N—Al/SPFC980) in accordance with embodiments of the disclosure. When pressure increases to 3 MPa, the IBA reduces to the lowest value compared to the pressure of 1 MPa and 2 MPa regardless of the joining temperature and joining time. FIG. 4 also shows that the IBA reduces from about 60% at 600° C. for 5 minutes to about 30% at 600° C. for 20 minutes. Further, when the temperature reduces from 600° C. to 545° C., the IBA further reduces from about 30% at 600° C. for 20 minutes to less than 10% at 545° C. for 20 minutes.

Figure 5:
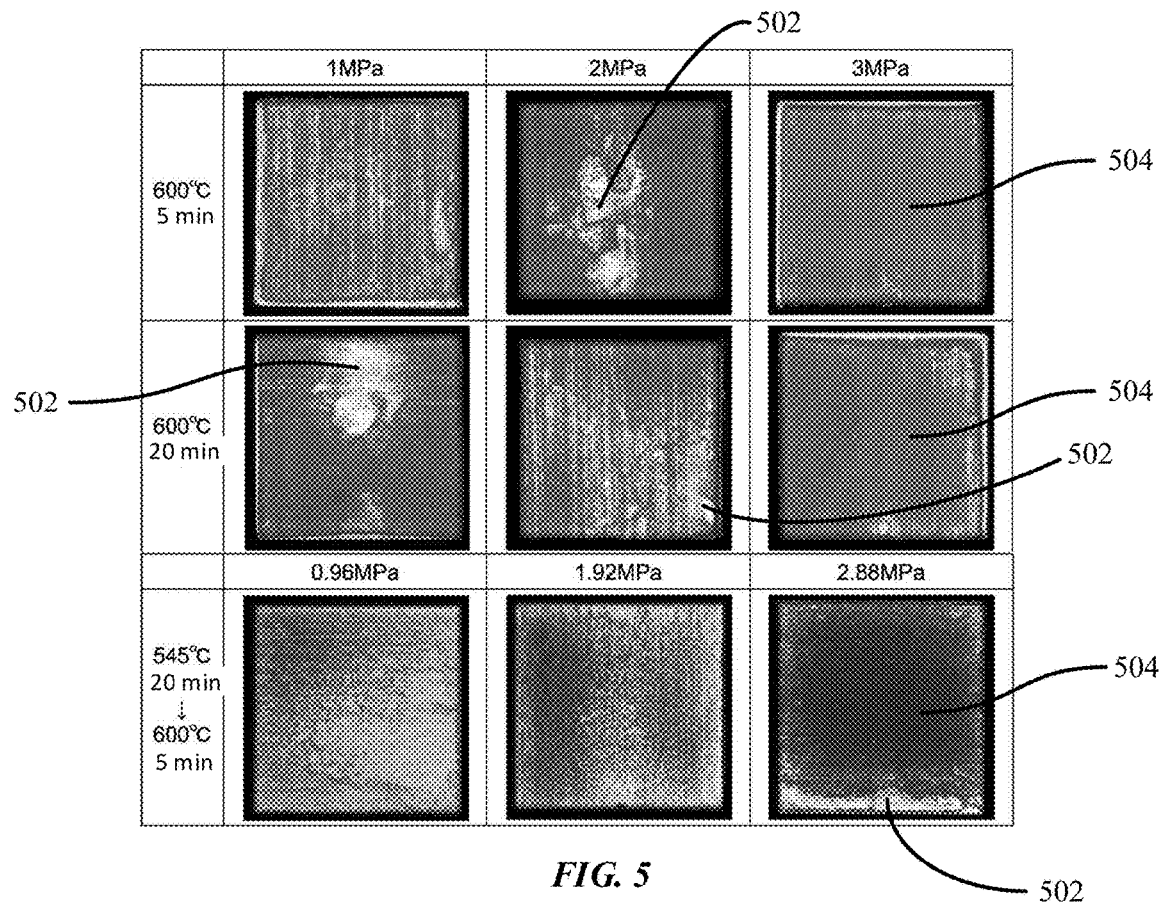
FIG. 5 shows the ultrasonic images that reveal substantially uniform bonding areas and partially insufficient bonding areas under various conditions in accordance with embodiments of the disclosure.

FIG. 5 shows ultrasonic images that reveal substantially uniform bonding areas and insufficient bonding areas under various conditions in accordance with embodiments of the disclosure. For instance, in the first row of FIG. 5, without preheating, the joining conditions include a joining temperature of 600° C. for a joining time of 5 minutes under different pressures including 1 MPa, 2 MPa, and 3 MPa. In these ultrasonic images, white areas 502 represent poor bonding while gray areas 504 represent good bonding.

For example, the ultrasonic images at a joining temperature of 600° C. for a joining time of 5 minutes under both a pressure of 1 MPa and a pressure of 2 MPa reveal more white spots than the image at a joining temperature of 600° C. for a joining time of 5 minutes under a pressure of 3 MPa, which reveals a substantially uniform gray area indicating good bonding. Based upon the ultrasonic images, the joining conditions including a joining temperature of 600° C. for a joining time of 5 minutes at a pressure of 3 MPa reveals the most uniform bonding among the pressures of 1 MPa, 2 MPa and 3 MPa.

Likewise, in the second row of FIG. 5, without preheating, the joining conditions include a joining temperature of 600° C. for 20 minutes under different pressures including 1 MPa, 2 MPa, and 3 MPa. The images at a joining temperature of 600° C. for a joining time of 20 minutes under both a pressure of 1 MPa and a pressure of 2 MPa reveal more white spots than the image at a joining temperature of 600° C. for a joining time of 20 minutes under a pressure of 3 MPa, which reveals more white spots than at the same joining temperature but a shorter joining time of 5 minutes.

Based upon the images, the joining conditions including a joining temperature of 600° C. for a joining time of 20 minutes at a pressure of 3 MPa reveals better bonding among the pressures of 1 MPa, 2 MPa and 3 MPa, but reveals poorer bonding than at 3 MPa and 600° C. for 5 minutes.

In the third row of FIG. 5, with preheating at 545° C. for 20 minutes, the joining conditions include a joining temperature of 600° C. for 5 minutes under different pressures including 0.96 MPa, 1.92 MPa, and 2.88 MPa. The image to the right most reveals the most uniform bonding at a pressure of 2.88 MPa.

Figure 6:
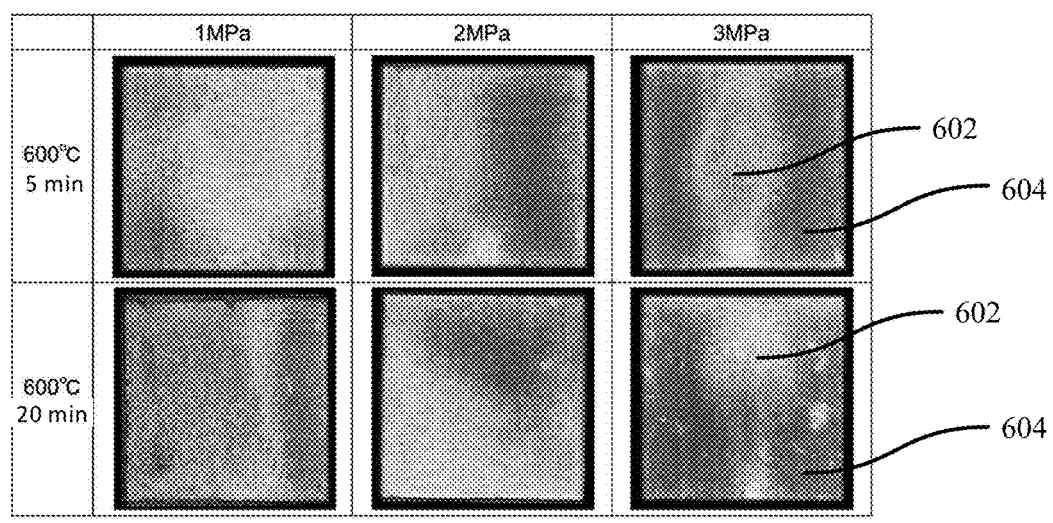
FIG. 6 shows the ultrasonic images of the aluminized composite that reveal insufficient bonding areas in accordance with embodiments of the disclosure.

FIG. 6 shows ultrasonic images of the aluminized composite that reveal insufficient bonding areas in accordance with embodiments of the disclosure. For instance, in the first row of FIG. 6, without preheating, the joining conditions include a joining temperature of 600° C. for a joining time of 5 minutes under different pressures including 1 MPa, 2 MPa, and 3 MPa. The images all show large white spots, which indicate poor bonding.

In the second row of FIG. 6, without preheating, the joining conditions are holding the aluminized composite at a joining temperature of 600° C. for a joining time of 20 minutes under different pressures including 1 MPa, 2 MPa, and 3 MPa. Again, the images all show large white spots, which indicate poor bonding.

Figure 7A:
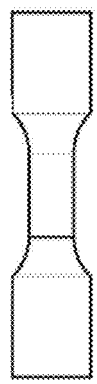
FIG. 7A illustrates a tensile test specimen in accordance with embodiments of the disclosure.

FIG. 7A illustrates a tensile test specimen in accordance with embodiments of the disclosure. As shown, a tensile test specimen has a reduced middle portion. The tensile test can be performed, for example by ASTM standard E8.

Figure 7B:
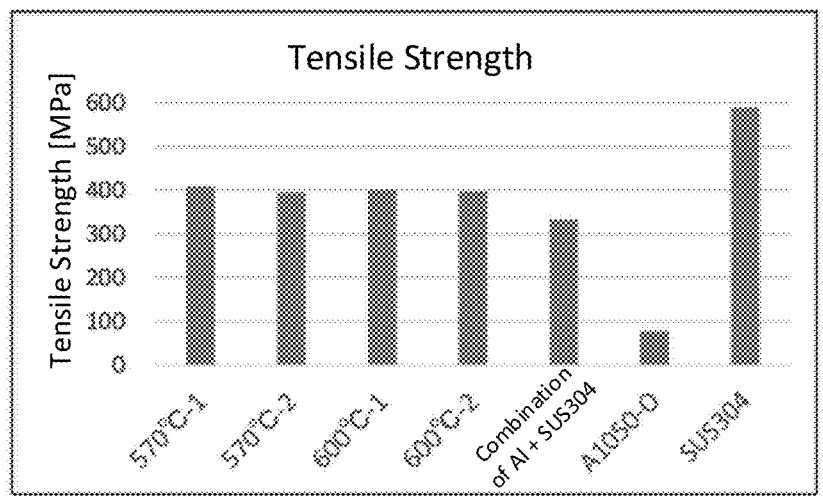
FIG. 7B shows the tensile strength of samples including aluminized composites joined under various temperatures and times in accordance with embodiments of the disclosure.

FIG. 7B shows the tensile strength of samples including aluminized composite joined under various temperatures and times in accordance with embodiments of the disclosure. In particular, the joining conditions include 570° C.-1, 570° C.-2, 600° C.-1, 600° C.-2. The theoretical composite including Al 1050-O and SUS 304, Al 1050-O, and SUS 304 are also illustrated in FIG. 7B as references. As shown, Al 1050-O has a tensile strength less than 100 MPa, which is much lower than a tensile strength of about 600 MPa for SUS 304. The theoretical composite of Al 1050-O and SUS 304 has a tensile strength over 300 MPa. The joined aluminized composites under various conditions, including 570° C.-1 (i.e. at joining temperature of 570° C. for 5 minutes), 570° C.-2 (i.e. at 570° C. for 5 minutes), 600° C.-1 (i.e. at 600° C. for 5 minutes), and 600° C.-2 (i.e. at 600° C. for 5 minutes), have a tensile strength of nearly 400 MPa, which is higher than the theoretical tensile strength of about 320 MPa for the composite of Al 1050-O and SUS 304. This indicates good bonding between the Al 1050-O and the SUS 304 base material.

Figure 7C:
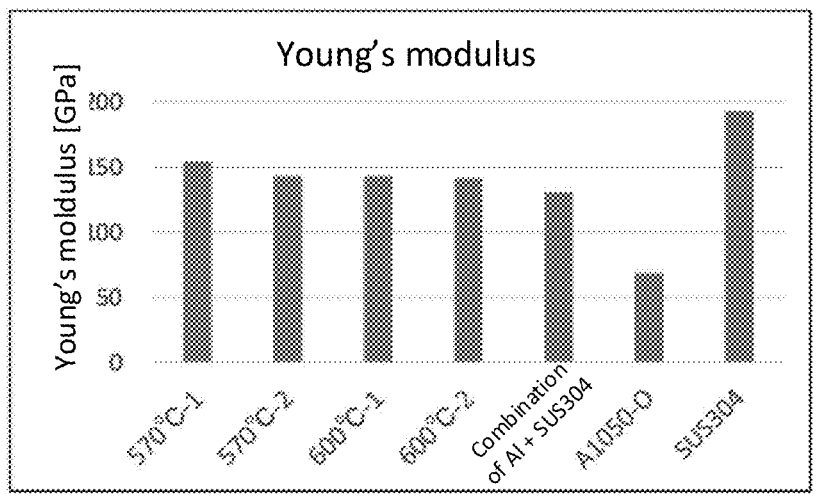
FIG. 7C shows the Young's modulus of samples including aluminized composites joined under various joining temperatures and joining times in accordance with embodiments of the disclosure.

FIG. 7C shows the Young's modulus of samples including an aluminized composite joined under various temperatures and times in accordance with embodiments of the disclosure. As shown, Al 1050-O has a Young's modulus about 70 GPa, which is much lower than a Young's modulus of about 200 GPa for SUS 304. The theoretical composite of Al 1050-O and SUS 304 has a Young's modulus about 130 GPa. The joined aluminized composites under various conditions, including 570° C.-1, 570° C.-2, 600° C.-1, and 600° C.-2, have a Young's modulus about 150 GPa, which is slightly higher than the theoretical Young's modulus of about 140 GPa for the composite of Al 1050-O and SUS 304. This indicates good bonding between the Al 1050-O and the SUS 304 base material.

Table 2 lists the tensile test results for composite samples of Al/SUS304/Al with Al—Si diffusion layer of about 20 μm thick. An Al—Si clad film can be used as the diffusion layer.

TABLE 2

Measured Tensile Properties of Composite Samples

| Sample | | Young's Modulus (GPa) | Tensile Strength (MPa) | Yield Strength at 0.2% (MPa) |
|---|---|---|---|---|
| Al—Si Clad and | 1 | 146 | 410 | 178 |
| Al/SUS304/Al | 2 | 143 | 396 | 180 |
|  | 3 | 143 | 402 | 177 |
|  | 3 | 141 | 398 | 179 |
| Al 1000 |  | 69 | 68 | 29 |
| Al 6065 |  | 69 | 309 (T6) | 274 |

Table 3 shows the predicted mechanical properties when high tensile strength stainless steel (HTSS) is used as the base material. The composite (Al/HTSS/AL) including Al—Si clad film coated on high tensile strength stainless steel reveals good color after dye coloring and has a fracture strain of about 5%. The composite has a Young's modulus of about 200 MPa, a tensile strength of about 1000 MPa. Several aluminum alloys are evaluated for use as the aluminum coating. Al 7075 (T6) may not be suitable for coloring while Al 7003 (T5) and Al 6065 (T6) are acceptable or good for coloring. The composites in Table 3 are also recyclable.

TABLE 3

Predicted Mechanical Properties of Composite Samples

| Sample | Young's Modulus (GPa) | Tensile Strength (MPa) | Fracture Strain (%) | Alumite Dye | Recycle |
|---|---|---|---|---|---|
| Al—Si Clad Film Al/HTSS/Al | ~200 | ~1000 | ~5 | Good | Acceptable |
| Al 7075 | ~70 | 570 (T6) | 9 | No | Good |
| Al 7003 | ~70 | 315 (T5) | 15 | Acceptable | Good |
| Al 6065 | ~70 | 240 (T6) | 12 | Good | Good |

The bending performance of the joined aluminized composite may also be evaluated by bending and visual inspection for cracks or defects.

II. Wrapping and Cladding Al Foil on a 2.5D Metal Enclosure

In order to maintain a surface finish of appropriate cosmetic quality for a product formed of recycled aluminum, the recycled can be wrapped by a thin aluminum layer (e.g., aluminum clad foil), which can be aluminized.

The recycled aluminum may be a one-side open 3D shaped enclosure. For example, a 3D rectangular shaped article has 6 sides. When one side is open, the article is referred to 2.5D. The aspect ratio of height to width or length is larger for a deep-shaped 2.5D while the aspect ratio of height to width or length is relatively small for a shallow-shaped 2.5D.

II. (a) Forming 2.5D Deep-Shaped Cladding Aluminum (Al) Foil

Figure 8:
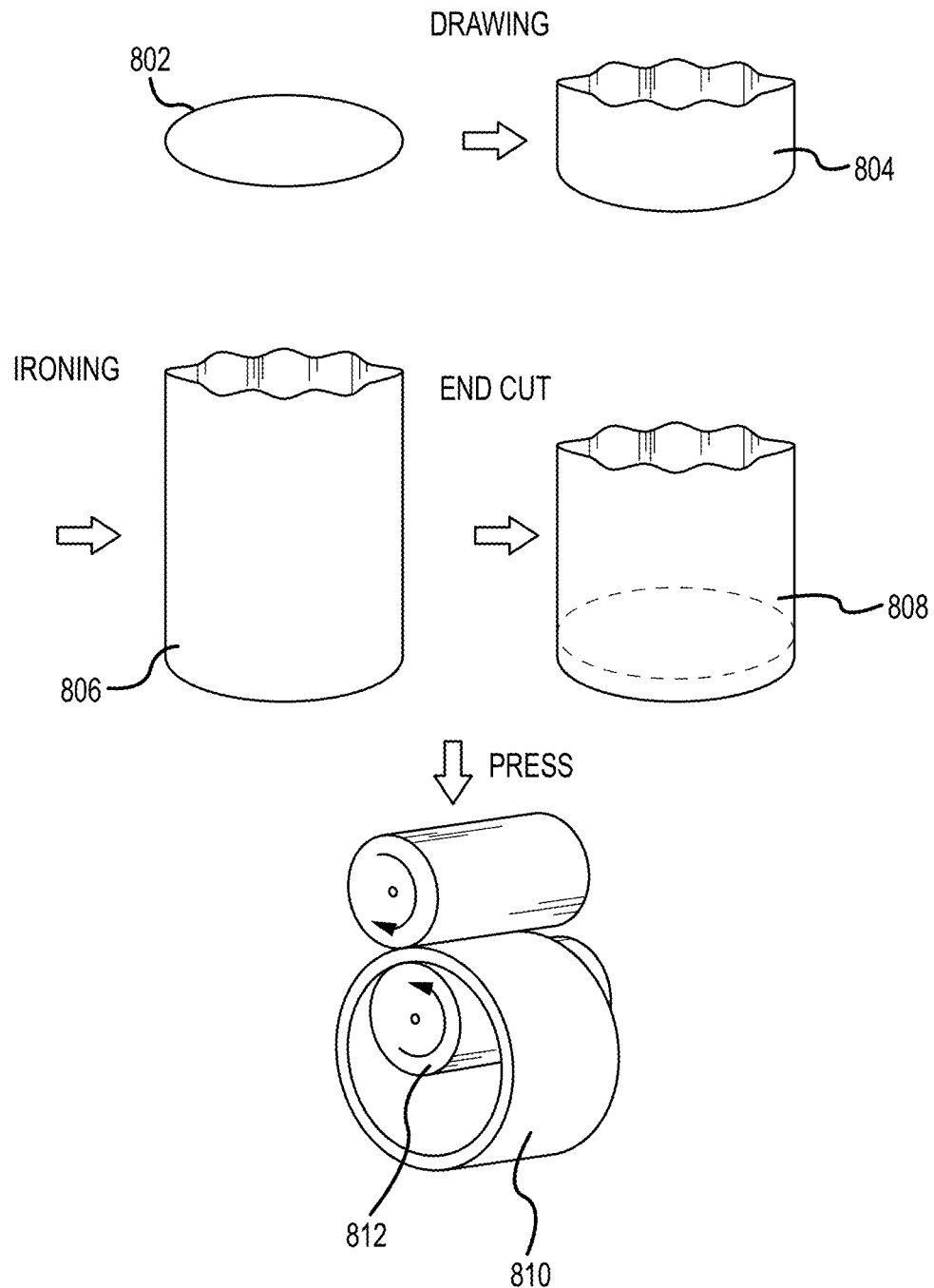
FIG. 8 shows the steps for forming a 2.5D deep-shaped Al foil without any seam marks on the surface in accordance with embodiments of the disclosure.

FIG. 8 shows the steps for forming a 2.5D deep-shaped Al foil without any seam marks on the surface in accordance with embodiments of the disclosure. As shown, an Al foil may be formed by drawing rough shape 804 from a ring stock 802. "Drawing" is a metalworking process which uses tensile forces to stretch a metal. As the metal is drawn or pulled, the metal stretches to become thinner into a desired shape and thickness. The metal may be in a form of sheet, wire, bar, or tube among others. To form a tube by drawing, a starting stock may be drawn through a die to reduce its diameter and increase its length. Drawing can be performed at room temperature, and thus is classified a cold working process. However, drawing may be performed at elevated temperatures to hot work large hollow sections in order to reduce forces.

Ironing may be used to make a deep-shaped Al foil 806 from the rough shape 804. Ironing is a sheet metal forming process that uniformly thins a metal in a specific area. Ironing in combination with deep drawing can produce a metal part having a uniform wall thickness with large aspect ratio of height to width or height to diameter.

Alternatively, in some embodiments, the bottom and top ends of the deep-shaped Al foil may be cut to make a ring-shaped ribbon 808. Ring shaped ribbon can be deep-shaped.

The ring-shape ribbon 808 may be further rolled to achieve the desirable length and thickness of the ring-ribbon shaped Al foil 810, as shown in FIG. 8. Rolling is a metal forming process in which a metal stock is passed through a pair of rollers 812 to reduce the thickness and to make the thickness uniform. Rolling may be performed an elevated temperature, e.g. the temperature of the metal above the recrystallization temperature. This rolling process is referred to hot rolling. Rolling may also be performed when the temperature of the metal is below its recrystallization temperature. This process is referred to cold rolling.

In some embodiments, if the drawing machine has enough power, a single drawing process may form a 2.5D deep-shaped aluminum clad foil.

II. (b) Wrapping an Al Clad Foil on a 2.5D Base Material

A base material can be wrapped by an Al clad foil, in accordance with embodiments of the disclosure. The base material may be formed of a recycled aluminum alloy, steel, stainless steel, or other metals or metal alloys.

Figure 9A:
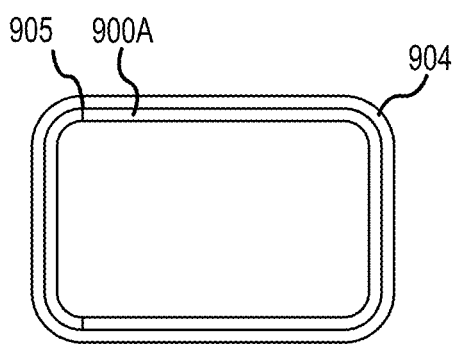
FIG. 9A is a top view of a base material wrapped with an outer aluminum clad foil (i.e., aluminum layer) in accordance with embodiments of the disclosure.

FIG. 9A depicts a top view of a base material wrapped with an outer aluminum layer (aluminum clad foil) in accordance with embodiments of the disclosure. As shown, an Al clad foil 904 is seamlessly wrapped around a base material 900A having a rectangular cross-section having four round corners 905.

Figure 9B:
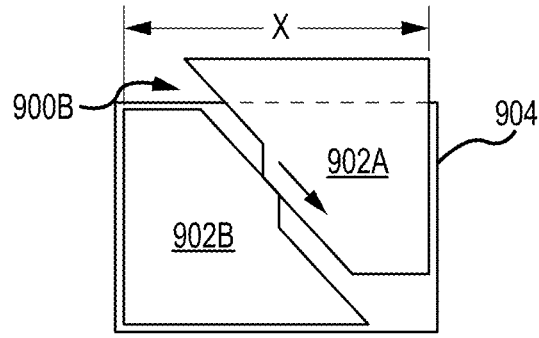
FIG. 9B is a side view of a base material including two separated pieces in accordance with embodiments of the disclosure.

In some embodiments, the base material may be a solid core formed of two separate pieces. FIG. 9B is a side view of a base material including two separated pieces in accordance with embodiments of the disclosure. A base material 900B may include two pieces 902A and 902B that are shaped to match together to form a single base material, as shown in FIG. 9B. The base material 900B can apply tension to an aluminum clad foil 904 wrapped outside the base material. As depicted in FIG. 9B, the first piece 902A slides down against the second piece 902B of the base material 900B in a direction as pointed by an arrow. As shown in FIG. 9B, the distance between the two pieces 902A-B starts from X.

Figure 9C:
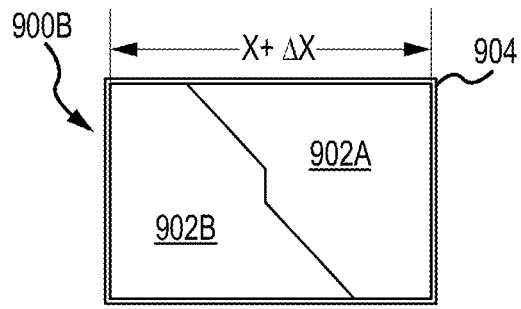
FIG. 9C is a side view of the two separated pieces of FIG. 9B being separated in accordance with embodiments of the disclosure.

FIG. 9C is a side view of the two separated pieces of FIG. 9B being separated in accordance with embodiments of the disclosure. As shown in FIG. 9C, when the distance X increases to X+ΔX, the two pieces 90A-B form a single base material in a desired shape. Due to the expansion in a horizontal distance from X to X+ΔX, the base material 900B applies a tension to an Al clad foil 904. In some variations, friction stir welding (FSW) may be used for joining the two separated pieces of the base material 900B.

Figure 9D:
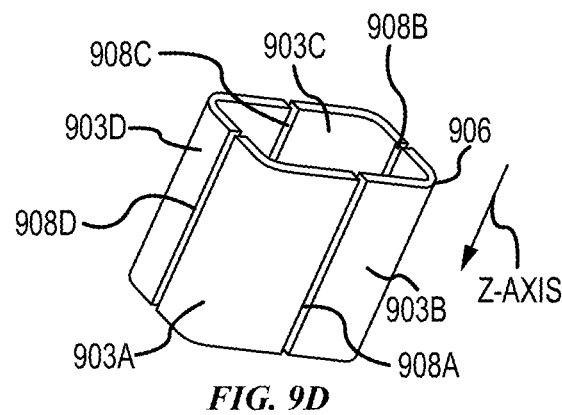
FIG. 9D is a perspective view of a base material including four separated pieces in accordance with embodiments of the disclosure.

In some embodiments, the base material may be an open box in a 2.5D shape. The open box may be formed of four separate pieces. FIG. 9D is a perspective view of a base material including four separated pieces in accordance with embodiments of the disclosure. The base material 900D can be split into four sectional pieces 903A-D around each round corner 906 of the rectangular cross-section. The base material 900D extends along a Z axis for a depth or length. Each piece is cut along vertical lines 908A, 908B, 908C, and 908D and extends along the Z axis perpendicular to the top of the base material 900D. For instance, the sectional piece 903A is between vertical lines 908A and 908B. Likewise, the sectional piece 903B is between vertical lines 908B and 908C, the sectional piece 903C is between vertical lines 908C and 908D, and the sectional piece 903B is between vertical lines 908D and 908A. The base material 900D can apply all round direction tension against the aluminum clad foil. Again, FSW may be used for joining the four separated pieces of the base material 900D.

Figure 9E:
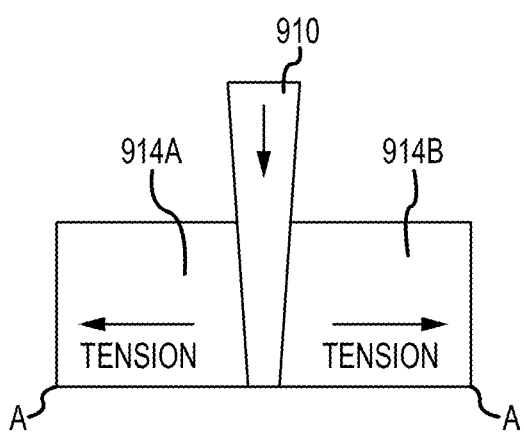
FIG. 9E shows a side view of a wedge applied to the base material of FIG. 9D in accordance with an embodiment of the disclosure.

In some cases, a small shear stress may be applied to the Al foil. For example, wedges may be used to avoid the small shear stress. For example, wedge shape parts can be used to apply a tension force on an Al foil wrapped around the base material. FIG. 9E shows a side view of a wedge applied to the base material depicted in FIG. 9D, in accordance with an embodiment of the disclosure. As shown, a section of the base material between Labels A-A includes two sub-sections 914A-B. A wedge 910 inserts into a gap between the two sub-sections 914A-B. The wedge 910 has a smaller width near the bottom end than the top end. When wedge 910 is pushed down toward a gap between two pieces of base material 914A and 914B, the two sub-sections 914A-B becomes further separated from each other, such that a tension can be applied to an Al foil wrapped around the base material.

Figure 9F:
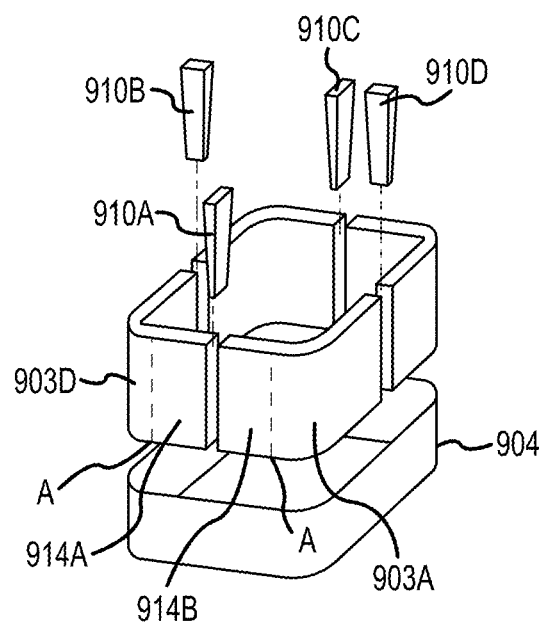
FIG. 9F shows a perspective view of four wedges applied to the base material of FIG. 9D in accordance with a second embodiment of the disclosure.

FIG. 9F shows a perspective view of four wedges applied to the base material of FIG. 9D in accordance with a second embodiment of the disclosure. As shown in FIG. 9F, four wedges 910A-D are pushed down toward the respective gaps between two separated pieces 903A-D of the base material. When the four wedges 910A-D are pushed down along the Z-axis as shown in FIG. 9D, the base material becomes expanded such that a tension would be applied to the Al foil 904 wrapped outside the base material including four pieces 903A-D.

II. (c) Joining a Cladding Al Foil to a 2.5D Base Material

In some variations, an aluminum foil can be joined to a base material by a combination of adhesion and localized heating. The localized heating can be welding, such as, spot welding or friction stir welding (FSW). The adhesive can fix the position before the welding by localized heating. The welding by localized heating is much more effective than the adhesive bonding. Localized heating can be performed such that it does not affect the visual appearance (e.g., grain size, color) on the first side of the aluminum foil.

In some embodiments, the adhesive is in a uniform layer of even thickness. In such circumstances, the Al is wrapped quickly to the base material.

In some embodiments, the bonding area and the welded area by spot welding or FSW do not overlap. This can be performed in this manner, for example, to avoid the chemical reaction or degradation of the adhesive due to localized heating.

In some embodiments, the adhesive covers at least 90% of the joining area between the aluminum foil and the base material. In some embodiments, the adhesive covers at least 93% of the joining area between the aluminum foil and the base material. In some embodiments, the adhesive covers at least 95% of the joining area between the aluminum foil and the base material. In some embodiments, the adhesive covers at least 97% of the joining area between the aluminum foil and the base material.

In some embodiments, the aluminum foil is formed of a virgin aluminum alloy. Virgin aluminum alloys can be anodized easily to have a desirable cosmetic appeal. Any alloy can be used.

In some embodiments, the adhesive may be a structural adhesive. The structural adhesive can be an epoxy. The structural adhesive can be cured by heat and has good durability and strength.

In some embodiments, the base material may include a recycled aluminum alloy.

In some embodiments, the aluminum foil is thin, while the base material is relatively thick to provide the structural strength. However, the aluminum coil needs to be thick enough not to cause disturbance to the surface on the first side of the aluminum foil when the second side of the aluminum foil is joined to the base material.

In some embodiments, the aluminum foil may be at least 0.5 mm thick. In some embodiments, the aluminum foil may be at least 1.0 mm thick.

In some embodiments, the base material may be at least 2 mm thick. In some embodiments, the base material may be at least 3 mm thick. In some embodiments, the base material may be at least 5 mm thick.

The thickness of the adhesive layer may be controlled, for example, using glass bead. In some embodiments, the adhesive may be 100 μm thick.

II. (d) One Side Resistance Spot Welding

The disclosure provides a one-side resistance spot welding (RSW) for cosmetic reliability of spot-welded outer appearance. RSW is a process in which contacting metal surface points are joined by the heat generated from resistance to an electric current. The RSW welds overlapping metal pieces at small points under pressure through the electric current. The spot welding creates a pool of molten metal that quickly cools and solidifies into a round joint, which is often referred to a weld nugget. In making a thin base material part, for example, a one-side spot welding is applied to the base material for welding to a clad material. The clad material can be an aluminum clad foil. The cosmetic outer appearance of the aluminum clad foil is not affected by the RSW.

Two metal pieces, such as two sheets, are held together under pressure exerted by electrodes. In some embodiments, the sheets may be in the 0.5 mm to 3 mm thickness range. The RSW process uses two shaped copper alloy electrodes to concentrate an electric current into a small weld spot and to simultaneously clamp the sheets together. By forcing a large electric current through the spot, the metal pieces would be melted to form the weld nugget.

In some embodiments, RSW delivers a large amount of energy, for example, 0.5 to 50 J, to the spot in a very short time, for example, roughly 10 to 1000 milliseconds. RSW allows the welding to occur without excessive heating of the remaining metal pieces. The amount of heat or energy delivered to the spot depends upon the resistance between the electrodes, and the magnitude and duration of the current. The amount of heat or energy may vary with the material properties and thickness of the metal pieces, as well as the type of electrodes. When the energy is not adequate, the metal pieces would not melt to cause a poor welding. However, when the energy is too high, a hole may be formed rather than a weld. RSW can be controlled to deliver proper energy to the spot in order to produce reliable welds.

FIGS. 10A-D show two different embodiments for joining an aluminum layer (aluminum clad foil) onto a base material by resistance spot welding. The electrodes for the resistance spot welding include an anode and a cathode.

Figure 10A:
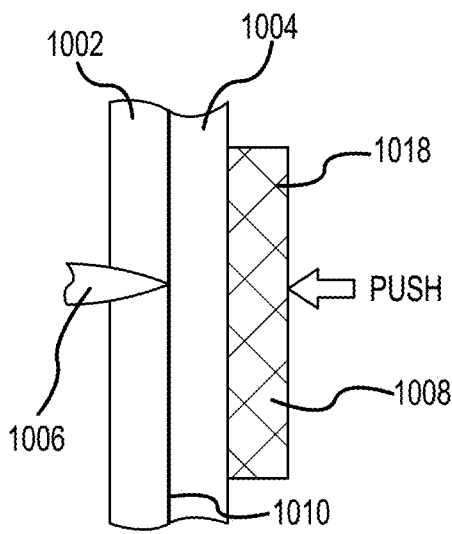
FIG. 10A illustrates a diagram for joining an aluminum clad foil onto a base material by resistance spot welding in accordance with a first embodiment of the disclosure.

In one embodiment, the anode and the cathode for RSW are two separated components. FIG. 10A illustrates a diagram for joining an aluminum clad foil onto a base material by resistance spot welding in accordance with a first embodiment of the disclosure. As shown in FIG. 10A, an anode 1006 penetrates through a base material 1002 toward an aluminum clad foil 1004. A cathode 1008 is on an opposite side of the aluminum clad foil 1004 from the anode 1006. The cathode 1008 is pushed against the aluminum clad foil 1004.

The cathode 1008 may be coupled to a cooling component, such as a water jacket, to form a cooling cathode plate, which can suppress dent formation on the first side of the aluminum clad foil 1004 by applying a force toward the cathode cooling plate.

The anode 1006 may be shaped like a sharp pin having a sharp end. The sharp end of the anode 1006 can stick into the base material 1002 and thus to provide a localized heating and form a small welding spot. The small welding spot is referred to a weld nugget.

Figure 10B:
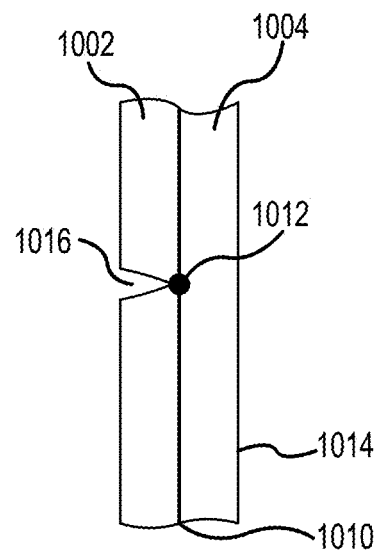
FIG. 10B illustrates a diagram for a base material joined with an aluminum clad foil including a spot nugget by the resistance spot welding of FIG. 10B.

FIG. 10B illustrates a diagram for a base material joined with an aluminum clad foil including a spot nugget by the resistance spot welding of FIG. 10B. As shown in FIG. 10B, a nugget 1012 can be formed by spot welding between the interface of the aluminum clad foil 1004 and the base material 1002. An adhesive layer 1010 bonds the remaining interface area between the aluminum clad foil 1004 and the base material 1002. After the spot welding is completed, the anode 1006 is can be removed, leaving a hole 1016 in the base material 1002.

In some embodiments, the diameter of the sharp end of the anode 1006 may be slightly larger than the nugget diameter.

Figure 10C:
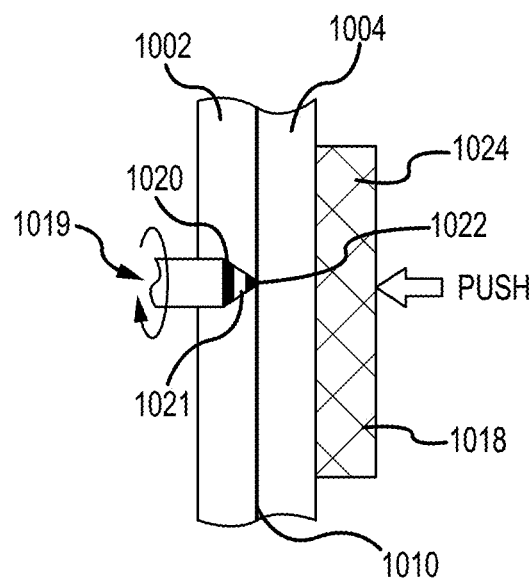
FIG. 10C illustrates a diagram for joining an aluminum clad foil onto a base material by resistance spot welding in accordance with a second embodiment of the disclosure.

In another embodiment, the anode and cathode for RSW can be integrated into a single pin. FIG. 10C illustrates a diagram for joining an aluminum clad foil onto a base material by resistance spot welding in accordance with a second embodiment of the disclosure. As shown in FIG. 10C, a resistance weld pin 1019 includes a cathode 1020 separated from an anode 1022 by an insulation layer 1021. The anode 1022 has a smaller diameter than that of the cathode 1020. The resistance weld pin 1019 penetrates through the base material 1002 and enters into the aluminum clad foil 1004, but does not extend to the outer surface 1014 of the aluminum clad foil 1004. A plate 1024 is pushed against the outer surface 1014. In some embodiments, the plate 1024 may be cooled with a cooling component, such as a water jacket 1018.

Figure 10D:
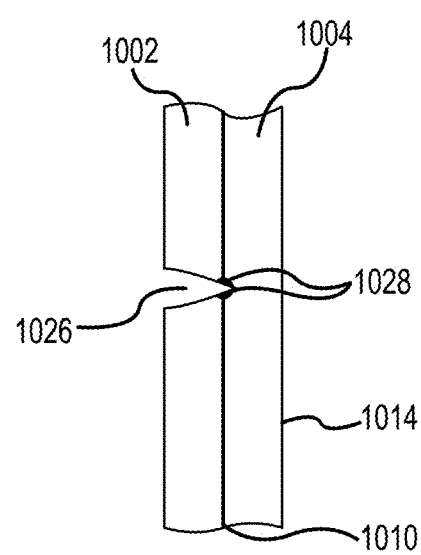
FIG. 10D illustrates a diagram for a base material joined with an aluminum clad including a ring nugget foil by the resistance spot welding of FIG. 10C.

FIG. 10D illustrates a diagram for a base material joined with an aluminum clad including a ring nugget foil by the resistance spot welding of FIG. 10C. As shown in FIG. 10D, after the spot welding is completed, the resistance pin including anode 1022 and cathode 1020 is removed, leaving a hole 1026 in the base material 1002. A ring weld nugget 1028 is formed near the interface between the base material 1002 and the aluminum clad foil 1004. Outside the region of the ring weld nugget 1028, the base material 1002 is bonded to the aluminum clad foil 1004 by adhesive 1010.

II. (e) One Side Friction Stir Welding

The disclosure further provides a one-side friction stir welding (FSW) for cosmetic reliability of spot-welded outer appearance. For a thin base material part, a one-side FSW is applied to the base material for welding to a clad material, such as an aluminum clad foil. The cosmetic outer appearance of the aluminum clad foil is not affected by FSW.

FSW is a solid-state joining process that uses a rotating tool to join two metal pieces without melting the two metal pieces. Heat is generated by friction between the rotating tool and the two metal pieces. The friction heat does not melt the two metal pieces, but creates a softened region near the rotating tool. While the rotating tool is traversed along a joint line, the two metal pieces are intermixed under the mechanical pressure generated by the rotating tool and the friction heat.

Figure 11:
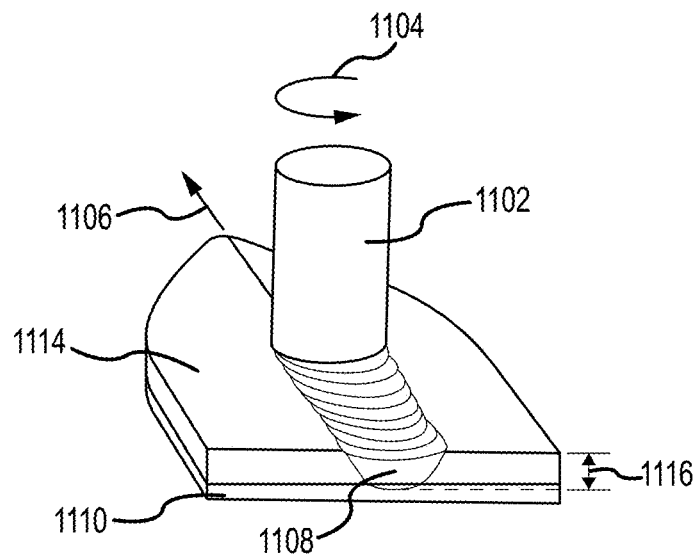
FIG. 11 illustrates a rotating tool for friction stir welding to generate a weld zone along a joint line of two metal pieces in accordance with embodiments of the disclosure.

FIG. 11 illustrates a rotating tool for friction stir welding to generate a weld zone along a joint line of two metal pieces in accordance with embodiments of the disclosure. FSW applies a downward force perpendicular to the surface of a base material 1114 to maintain the position of a rotating tool 1102 below the surface of the base material 1114. As shown, the rotating tool 1102 rotates as along direction 1104 and moves backward linearly 1106. A torque rotates the rotating tool. The amount of torque may vary with the downward force and the friction of the base material 1114 in the aluminum clad film 1110.

A stir zone 1108 is formed from FSW. The stir zone is a region of heavily deformed material, which includes a recrystallized mixture of the base material 1114 and the aluminum clad foil 1110. The microstructure, porosity, morphology, grain size, and texture of the stir zone are different from the base and aluminum clad foil in the absence of friction heating. As shown in FIG. 11, the depth 1116 of the stir zone 1108 is more than the thickness of the base material 1114 and extends into the aluminum clad foil 1110. In various aspects, the localized heating due to FSW does not alter the cosmetics of the first side of the aluminum layer (e.g. no effect on color, morphology, porosity, grain size and/or texture of the first side of the aluminum layer). The cosmetics can be determined by measuring one or more cosmetic or morphological aspects between different portions of the alloy. For example, the portion of the aluminum layer opposite the welded portion of the contact region has an average grain size the same as the portion of the aluminum layer opposite the adhesively bonded portion of the contact region. The same comparison can be made for other cosmetic/morphology aspects, such as color, porosity, and/or texture. Such measurement may be made for any variation described herein.

Figure 12A:
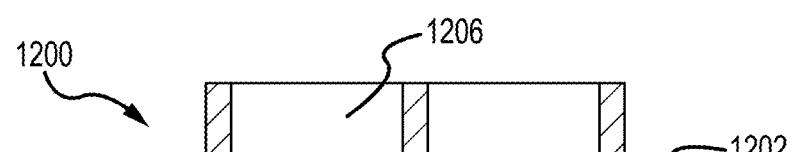
FIG. 12A illustrates a top view of a welding pattern for a composite including a base material joined by an aluminum clad foil in accordance with embodiments of the disclosure.
Figure 12B:
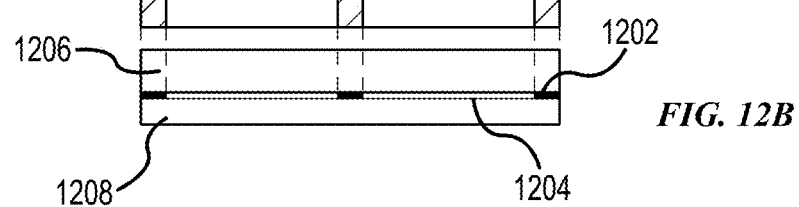
FIG. 12B illustrates a cross-sectional view of the composite of FIG. 12A in accordance with embodiments of the disclosure.

A portion of the base material can be welded to the aluminum clad foil. The welded portion has a welding pattern which may vary with the shape of the 2.5D article. FIG. 12A illustrates a top view of a welding pattern for a composite including a base material joined by an aluminum clad foil in accordance with embodiments of the disclosure. As shown in FIG. 12A, a welding pattern includes three welding regions 1202 formed on the surface of a base material 1206. The welding regions 1202 are in the form of a strip. FIG. 12B illustrates a cross-sectional view of the composite of FIG. 12A in accordance with embodiments of the disclosure. As shown in FIG. 12B, a composite 1200 includes the base material 1206 joined to an aluminum clad foil 1208 by a combination of an adhesive region 1204 and a welding region 1202. The welding region 1202 does not overlap with the adhesive region 1204. The welding condition in FSW is controlled such that the first side of the aluminum clad foil is not disturbed by FSW. The first side is an exposed surface, which is referred as a first side. The term "aluminum clad foil" is interchangeably used with the "aluminum foil."

In some embodiments, when the base material is thinner, the speed of the FSW may be increased such that the FSW does not penetrate through to the first side of the aluminum foil.

It will be appreciated by those skilled in the art that the welding pattern may vary with the shape of the base material.

The aluminum foil can anodized to have a particular color and appearance. The colored aluminum foil may have a shiny surface finish for cosmetic appeal.

III. Aluminization Coloring

Figure 13:
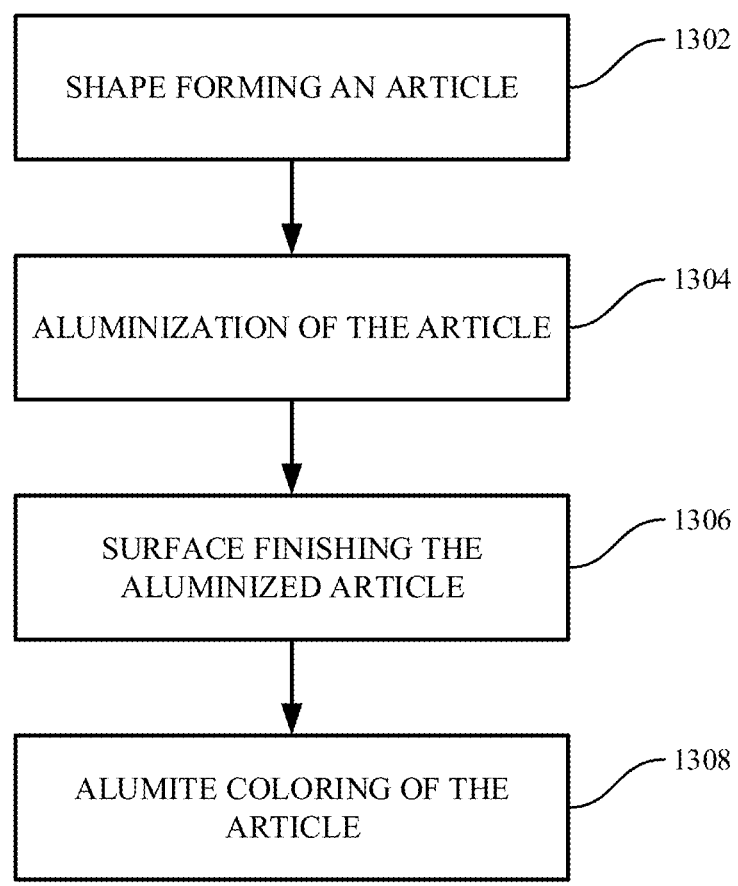
FIG. 13 shows a flow chart illustrating steps for aluminization coloring of metallic parts in accordance with embodiments of the disclosure.

One of the coloring techniques for metallic materials other than aluminum includes an aluminization technique. FIG. 13 shows a flow chart illustrating steps for aluminization coloring of metallic parts in accordance with embodiments of the disclosure.

Method 1300 starts with shape forming an article at operation 1302. The shape forming may include Computer Numerical Control (CNC) machining process among others.

Method 1300 may also include aluminization of the aluminized composite at operation 1304, such as aluminum coated steel, aluminum coated stainless steel, or aluminum coated recycled aluminum. Without being limited to a particular mechanism of action, the aluminized composite may include a diffusion layer between the aluminum layer and the base material.

The aluminum coating can be anodized. Anodizing is a surface treatment process for metal, most commonly used to protect aluminum alloys. Anodizing uses electrolytic passivation to increase the thickness of the natural oxide layer on the surface of metal parts. Anodizing may increase corrosion resistance and wear resistance, and may also provide better adhesion for paint primers and glues than bare metal. Anodized films may also be used for cosmetic effects, for example, adding interference effects to reflected light.

Method 1300 may also include surface finishing at operation 1306. The surface finishing may include blasting, among others. In some embodiments, the aluminized composite can form enclosures for the electronic devices. The enclosures may be designed to have a blasted surface finish, or an absence of streaky lines. Blasting is a surface finishing process, for example, smoothing a rough surface or roughening a smooth surface. Blasting may remove surface materials by forcibly propelling a stream of abrasive material against a surface under high pressure.

Method 1300 may further include alumite coloring at operation 1308. Dye coloring is one of the commonly used methods for coloring steel or stainless.

Standard methods may be used for evaluation of cosmetics including color, gloss, and haze. The color of objects may be determined by the wavelength of light that is reflected or transmitted without being absorbed, assuming incident light is white light. The visual appearance of objects may vary with light reflection or transmission. Additional appearance attributes may be based on the directional brightness distribution of reflected light or transmitted light, commonly referred to glossy, shiny, dull, clear, haze, among others. The quantitative evaluation may be performed based on ASTM Standards on Color & Appearance Measurement or ASTM E-430 Standard Test Methods for Measurement of Gloss of High-Gloss Surfaces, including ASTM D523 (Gloss), ASTM D2457 (Gloss on plastics), ASTM E430 (Gloss on high-gloss surfaces, haze), and ASTM D5767 (DOI), among others. The measurements of gloss, haze, and DOI may be performed by testing equipment, such as Rhopoint IQ.

In some embodiments, color may be quantified by parameters $L^*$, $a^*$, and $b^*$, where $L^*$ stands for light brightness, $a^*$ stands for color between red and green, and $b^*$ stands for color between blue and yellow. For example, high $b^*$ values suggest an unappealing yellowish color, not a gold yellow color. Values near zero in $a^*$ and $b^*$ suggest a neutral color. Low $L^*$ values suggest dark brightness, while high $L^*$ value suggests great brightness. For color measurement, testing equipment, such as X-Rite Color i7 XTH, X-Rite Coloreye 7000 may be used. These measurements are according to CIE/ISO standards for illuminants, observers, and the $L^*$ $a^*$ $b^*$ color scale. For example, the standards include: (a) ISO 11664-1:2007(E)/CIE S 014-1/E:2006: Joint ISO/CIE Standard: Colorimetry—Part 1: CIE Standard Colorimetric Observers; (b) ISO 11664-2:2007(E)/CIE S 014-2/E:2006: Joint ISO/CIE Standard: Colorimetry—Part 2: CIE Standard Illuminants for Colorimetry, (c) ISO 11664-3:2012(E)/CIE S 014-3/E:2011: Joint ISO/CIE Standard: Colorimetry—Part 3: CIE Tristimulus Values; and (d) ISO 11664-4:2008 (E)/CIE S 014-4/E:2007: Joint ISO/CIE Standard: Colorimetry—Part 4: CIE 1976 $L^*$ $a^*$ $b^*$ Colour Space.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Example composite 100 is shaped like a flat plate. However, it will be appreciated by those skilled in the art that the shape of the aluminized composite may vary. The aluminized composite may be shaped to form a case for an electronic device.

In various embodiments, the aluminized composite may be used as housings or other parts of an electronic device, such as, for example, a part of the housing or casing of the device. Devices can include any consumer electronic device, such as cell phones, desktop computers, laptop computers, and/or portable music players. The device can be a part of a display, such as a digital display, a monitor, an electronic-book reader, a portable web-browser, and a computer monitor. The device can also be an entertainment device, including a portable DVD player, DVD player, Blue-Ray disk player, video game console, or music player, such as a portable music player. The device can also be a part of a device that provides control, such as controlling the streaming of images, videos, sounds, or it can be a remote control for an electronic device. The alloys can be part of a computer or its accessories, such as the hard driver tower housing or casing, laptop housing, laptop keyboard, laptop track pad, desktop keyboard, mouse, and speaker. The alloys can also be applied to a device such as a watch or a clock.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An aluminized composite comprising:
   a base material;
   a diffusion layer comprising Si in an Al matrix disposed on the base material; and
   an aluminum alloy disposed on the diffusion layer, wherein the diffusion layer has a melting temperature lower than the aluminum alloy;
   wherein the Si content in the Al matrix is lower than 1.0 atomic %.

2. The aluminized composite of claim 1, wherein the base material is selected from steel and recycled aluminum.

3. The aluminized composite of claim 1, wherein the aluminum alloy has a thickness ranging from 0.5 μm to 1000 μm.

4. The aluminized composite of claim 1, wherein the diffusion layer has a thickness of at least 20 μm.

5. A method of coloring a base material, the method comprising:
   placing, in a joining device, a stack of layers comprising the base material, a first diffusion layer comprising Si in an Al matrix disposed on a first side of the base material, and a first aluminum layer disposed on the first diffusion layer, wherein the Si content in the Al matrix is lower than 1.0 atomic %;
   applying a pressure to the stack of layers; and
   heating the stack of layers to a first elevated temperature for a first period of time to join the aluminum layer to the base material.

6. The method of claim 5, wherein the placing step further comprises:
   disposing a second diffusion layer comprising Si in an Al matrix on a second side of the base material opposite the first side of the base material; and
   disposing a second aluminum layer on the second diffusion layer.

7. The method of claim 6, wherein, wherein the Si content in the Al matrix is lower than 1.0 atomic %.

8. The method of claim 6, further comprising preheating the stack of layers to a second elevated temperature for a second period of time prior to the heating step.

9. The method of claim 5, wherein the first elevated temperature is within 80 degrees Celsius of the melting temperature of the diffusion layer.

10. The method of claim 6, wherein the pressure is at least 1 MPa.

11. The method of claim 6, wherein the bonding area is at least 80%.